(No Model.)
A. HEINZ.
GLASS PEN.
No. 435,969. Patented Sept. 9, 1890.
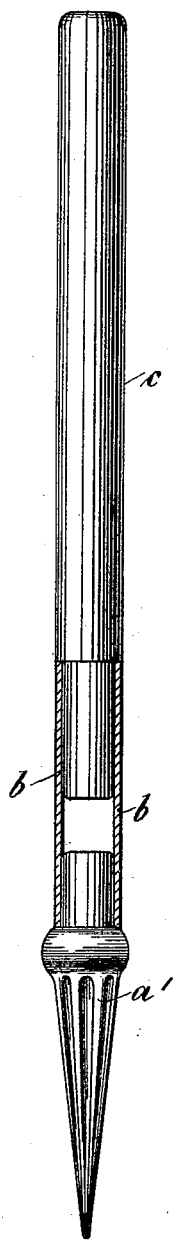
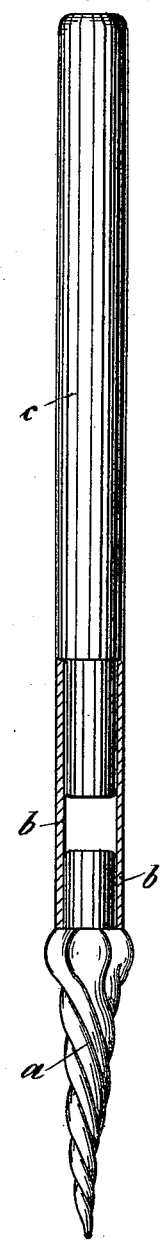
Witnesses:
Inventor:
Adolph Heinz
by
Attorneys.

UNITED STATES PATENT OFFICE.

ADOLPH HEINZ, OF BONN, PRUSSIA, GERMANY, ASSIGNOR TO GUSTAV PICKHARDT, OF SAME PLACE.

GLASS PEN.

SPECIFICATION forming part of Letters Patent No. 435,969, dated September 9, 1890.

Application filed October 9, 1889. Serial No. 326,439. (No model.) Patented in Germany June 26, 1887, No. 41,705.

*To all whom it may concern:*

Be it known that I, ADOLPH HEINZ, a subject of the King of Prussia and Emperor of Germany, and a resident of Bonn, in the Province of the Rhine, Kingdom of Prussia, German Empire, have invented certain new and useful Improvements in Glass Pens, (for which I have obtained a patent in Germany, No. 41,705, on the 26th day of June, 1887,) of which the following is a clear description.

In order to make my invention more clear I refer to the accompanying drawings, in which—

Figure 1 shows my improved glass pen having twisted grooves, and Fig. 2 a modification of the same having eight straight grooves.

The pen consists of a piece of glass sharpened out to a long slender point $a$, and having grooves running spirally out to the point. To this glass pen is attached a short brass tube $b$, in which the wooden pen-holder $c$ is fixed. The object of twisting the grooves round the point instead of making them run straight out to a point is to prevent the ink from running too freely down the sides of the point and making blots.

In the modification shown in Fig. 2, the grooves run straight and are eight in number, and run to a very sharp point $a'$.

I am aware that glass pens with straight grooves have been manufactured previous to my invention, but up to the present only four grooves have been made, which allows the ink to run too quickly down the pen, causing blots.

Having thus fully described and ascertained the nature of my invention, what I desire to secure by Letters Patent of the United States is—

1. A pen formed of a piece of round glass drawn out to a point and having grooves running spirally down the sloping sides and meeting at the point, in the manner as described.

2. The combination of the glass pen having the spiral grooves, with the brass tube and wooden pen-holder, in the manner described.

In witness whereof I have hereunto set my hand in presence of two witnesses.

ADOLPH HEINZ.

Witnesses:
GUSTAVE ALBERT OELRICHS,
J. SLOSS.